United States Patent
Koller et al.

(10) Patent No.: US 9,635,801 B2
(45) Date of Patent: May 2, 2017

(54) SINGULATING HAND PLANTER AND FERTILIZER APPLICATOR

(71) Applicant: THE BOARD OF REGENTS FOR OKLAHOMA STATE UNIVERSITY, Stillwater, OK (US)

(72) Inventors: Adrian A. Koller, Pfeffikon (CH);
Randal K. Taylor, Stillwater, OK (US);
William R. Raun, Stillwater, OK (US)

(73) Assignee: THE BOARD OF REGENTS FOR OKLAHOMA STATE UNIVERSITY, Stillwater, OK (US)

( * ) Notice: Subject to any disclaimer, the term of this patent is extended or adjusted under 35 U.S.C. 154(b) by 0 days.

(21) Appl. No.: 14/776,848

(22) PCT Filed: Mar. 17, 2014

(86) PCT No.: PCT/US2014/030400
§ 371 (c)(1),
(2) Date: Sep. 15, 2015

(87) PCT Pub. No.: WO2014/145605
PCT Pub. Date: Sep. 18, 2014

(65) Prior Publication Data
US 2016/0037711 A1    Feb. 11, 2016

Related U.S. Application Data

(60) Provisional application No. 61/799,338, filed on Mar. 15, 2013.

(51) Int. Cl.
*A01C 5/02* (2006.01)
*A01C 7/02* (2006.01)
(Continued)

(52) U.S. Cl.
CPC ............ *A01C 7/02* (2013.01); *A01C 5/02* (2013.01); *A01C 7/002* (2013.01); *A01C 15/02* (2013.01)

(58) Field of Classification Search
USPC .................................... 111/92, 95, 96
See application file for complete search history.

(56) References Cited

U.S. PATENT DOCUMENTS

| 89,742 A | * | 5/1869 | Doddridge | ............. A01C 7/02 |
| | | | | 111/95 |
| 219,573 A | * | 9/1879 | Frost | ..................... A01C 5/02 |
| | | | | 111/96 |

(Continued)

FOREIGN PATENT DOCUMENTS

| DE | 3526199 C1 | 6/1986 |
| KR | 20080082044 A | 9/2008 |
| RU | 2154367 C2 | 8/2000 |

OTHER PUBLICATIONS

WO 2014/145605 A1, International Search Report and Written Opinion, Aug. 7, 2014, Koller, et al., The Board of Regents for Oklahoma State University, PCT/US2014/030400, filed Mar. 17, 2014.

*Primary Examiner* — Alicia Torres
(74) *Attorney, Agent, or Firm* — Terry L. Watt

(57) ABSTRACT

A hand-planter for singulation planting of cereal, grain, seed and other crops includes a tapered soil engagement component for striking and penetrating a soil surface. With each planter strike to the soil surface, the planter is actuated to meter a granular material product by reciprocating a drum to rotate, thereby exposing a cavity to a material hopper. As the actuation force is released, the reciprocating drum rotates in an opposite direction to its original location and drops the material that has been metered.

11 Claims, 5 Drawing Sheets

(51) Int. Cl.
*A01C 15/02* (2006.01)
*A01C 7/00* (2006.01)

(56) References Cited

U.S. PATENT DOCUMENTS

| | | | | |
|---|---|---|---|---|
| 246,488 A | * | 8/1881 | Frost | A01C 5/02 111/96 |
| 517,487 A | * | 4/1894 | Schendzelos | A01C 5/02 111/96 |
| 3,955,513 A | * | 5/1976 | Akeyson | A01C 15/02 111/8 |

* cited by examiner

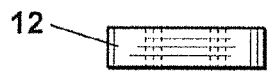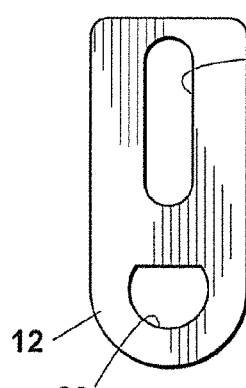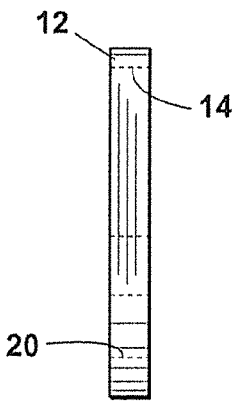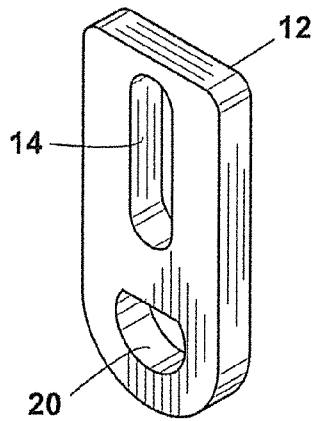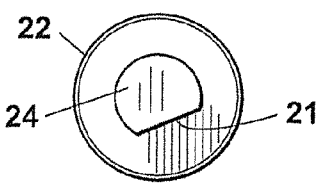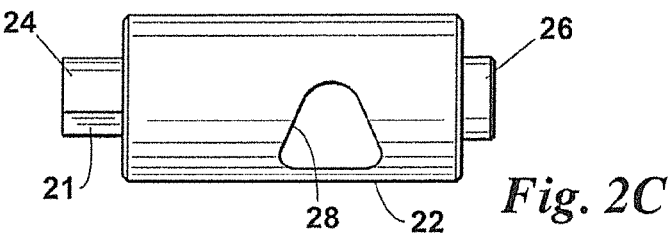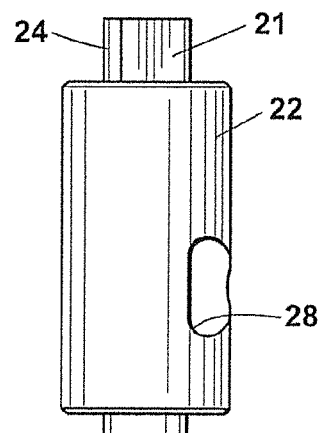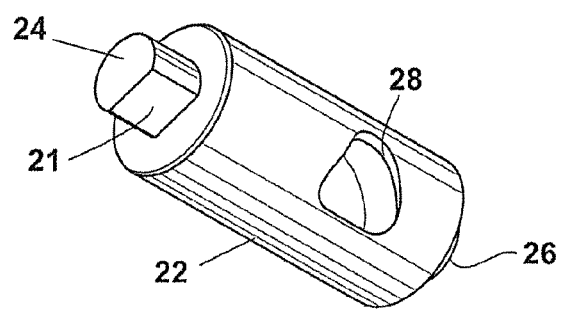

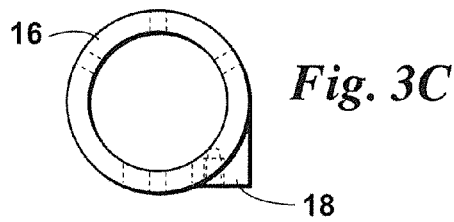
*Fig. 3C*
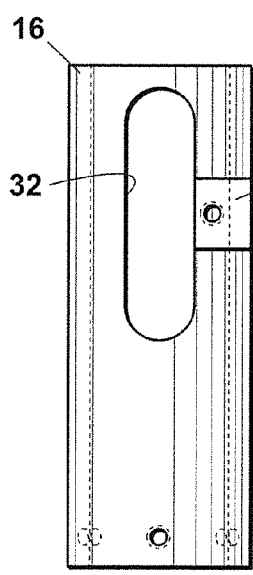
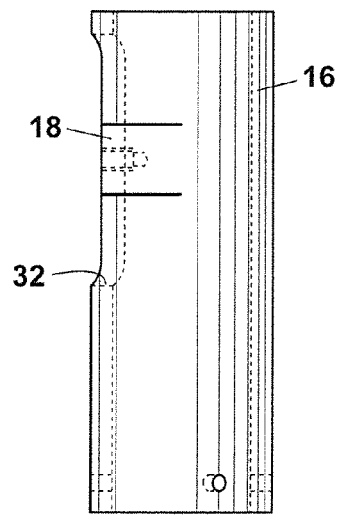
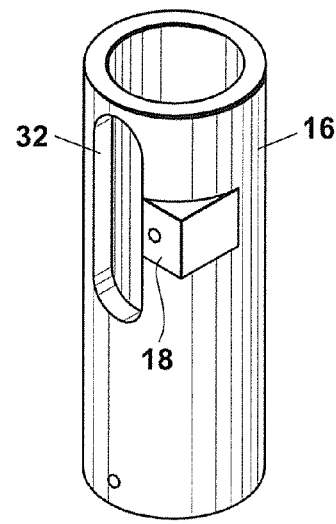
*Fig. 3D*
*Fig. 3A*  *Fig. 3B*
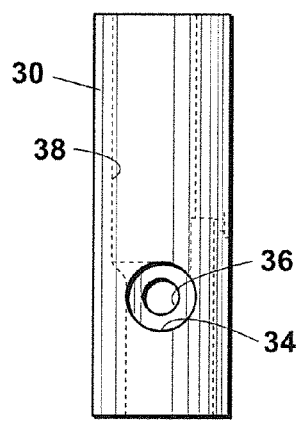
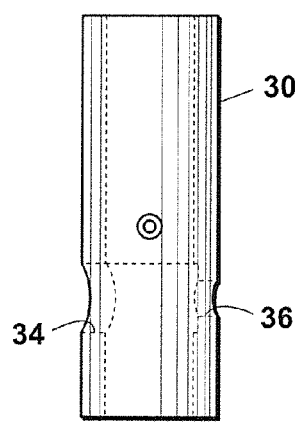
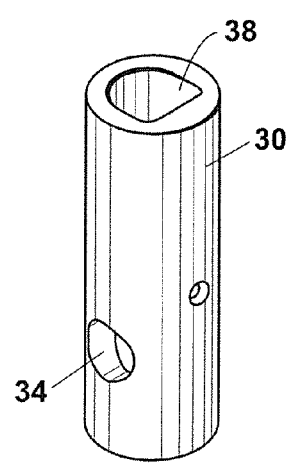
*Fig. 4C*
*Fig. 4A*  *Fig. 4B*

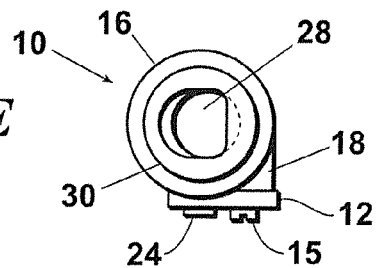
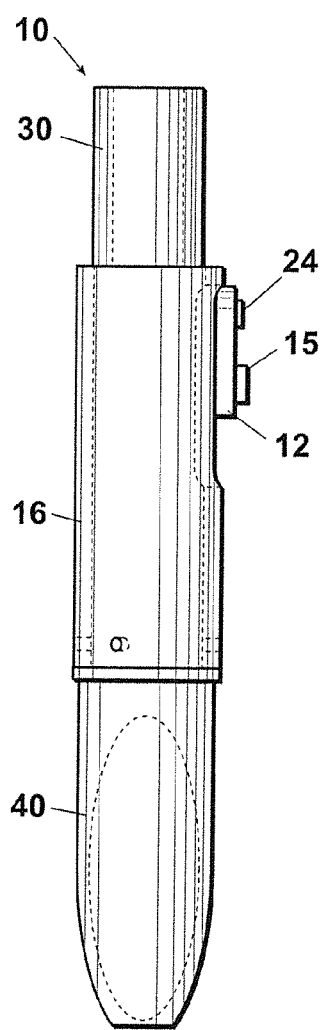
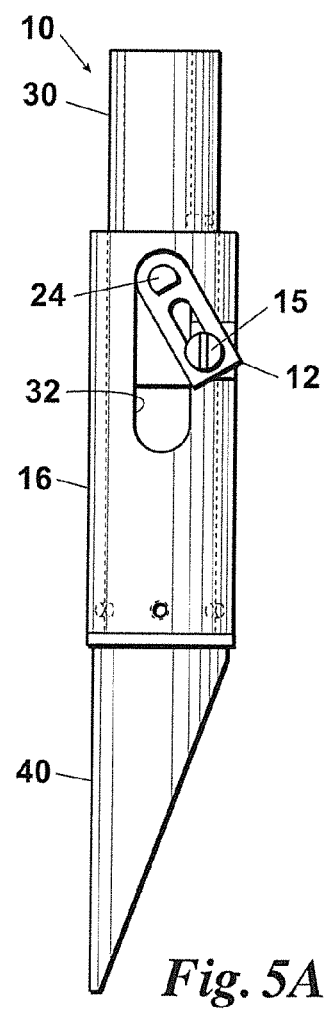
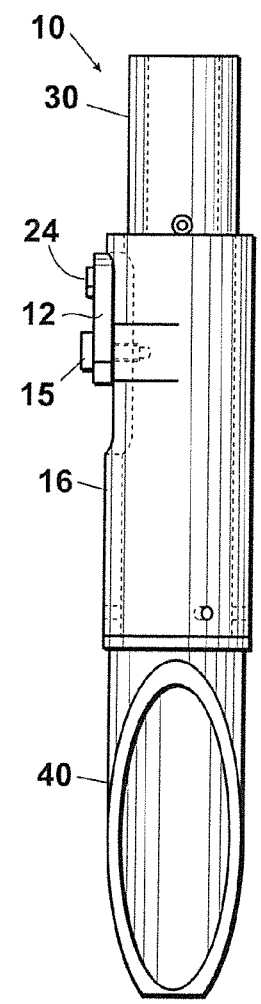
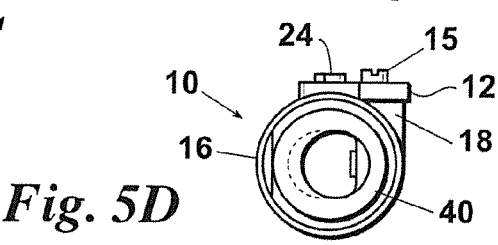
Fig. 5E
Fig. 5C
Fig. 5A
Fig. 5B
Fig. 5D

SINGULATING HAND PLANTER AND FERTILIZER APPLICATOR

CROSS REFERENCE TO RELATED APPLICATION

This application claims the benefit of U.S. Provisional Application No. 61/799,338, filed Mar. 15, 2013, herein incorporated by reference in its entirety for all purposes.

BACKGROUND OF THE INVENTION

Field of the Invention

This invention relates generally to a device for hand planting cereal grain seed and other crops where singulation (single seeds planted per strike) is needed. More particularly, but not by way of limitation, the present invention relates to a method for metering granular products including but not limited to seed, fertilizer, and chemicals.

Background

Current cereal grain producers in the third world do not have access to hand-planting systems capable of singulating seed. As an example, one problem with current techniques for planning maize in the third world (e.g., Sub Saharan Africa, Asia, Central and South America) is that the farmer essentially uses a heavy stick whereby 2-3 seeds are planted per hill roughly 35 cm apart. Although this is incredibly inefficient, this method of planting is commonplace for third world maize farmers, this approach being largely dictated by terrain, circumstance, and resources. Single seeds planted 14-17 cm apart, much like conventional planters accomplish in the developed world, result in increased yields. Despite the fact that third world maize yields are generally less than 2.0 Mg/ha, a 25% yield increase on 60% of the hand planted maize area in the third world would be worth more than 2.4 billion dollars/year.

Of course, when 2-3 seeds are placed in the same hole, up to 2 of the 3 that emerge usually abort later in the cycle.

Therefore if one seed could be placed in each depression, lower populations could be planted, better plant stand homogeneity could be achieved and that would lead to increased grain yields. Increased maize grain yields are common place when homogeneity of plant stands is achieved.

Thus it is an object of the present invention to provide a convenient method for planting seed of various types whereby singulation (single seeds planted per strike) is achieved.

It is a further object of the present invention to provide a viable method of fertilizing macronutrients (N—Nitrogen, P—Phosphorus, K—Potassium) for the landscapes where everything is accomplished by hand. Placing N fertilizer (particularly urea) below the surface, really via any mechanism is critical for improved nitrogen use efficiency. By placing urea beneath the soil surface soil, ammonia (NH3) volatilization losses are essentially eliminated, thus increasing use efficiency.

Heretofore, as is well known in the agriculture arts there has been a need for an invention to address and solve the disadvantages of prior art approaches. Accordingly it should now be recognized, as was recognized by the present inventors, that there exists, and has existed for some time, a very real need for a system and method that would address and solve the above-described and other problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

The present invention is a device and method for metering granular products including but not limited to seed, fertilizer, and chemicals. The device is capable of serving as a small scale fertilizer and alternative product applicator.

The present invention provides a device for metering dry granular products and placing them beneath the soil surface. The specific purpose is for planting single cereal grain seeds. This device is made possible via gravity delivery of seed/fertilizers to a reciprocating drum with alternative shaped cavities. The shape of the cavities can be varied based on the type of product being applied. The device preferably includes a tapered (or pointed) soil engagement component capable of striking or penetrating the soil surface. With each planter strike to the soil surface, the device is actuated to meter a granular material product wherein a preferable substantially cylindrical reciprocating drum rotates to expose the cavity to the material hopper. As the actuation force is released, the reciprocating drum rotates in the opposite direction to its original location and drops the material that has been metered. The process could be reversed if it is found to be suitable for a particular application wherein the metered material is deposited when the activation force is applied. Cavities in the reciprocating drum can be modified for different seeds and/or fertilizers. Specifically, cavities can be optimized to singulate maize seed. This tool offers an affordable, easily adoptable technology for all third world cereal grain farmers.

Also, the inventive process is particularly well suited to the mid-season application of nitrogen and/or other nutrients where deficiencies can be corrected from pre-season applications.

Added benefits of the hand planter/fertilizer applicator of the present disclosure will be to remove chemically treated seeds (organophosphates, carbamates, chlordanes, and others known to be present or may be present) from the hands of small farmers. Decreased soil erosion from improved contour planting, and plant proximity will also be achieved.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIGS. 1A-1D depict multiple views of the reciprocating lever of the metering device of an embodiment.

FIGS. 2A-2D depict multiple views of the reciprocating drum of the metering device of an embodiment.

FIGS. 3A-3D depicts multiple views of the external housing of the metering device of an embodiment.

FIGS. 4A-4C depict multiple views of the reciprocating drum housing of the metering device of an embodiment.

FIGS. 5A-5G depict multiple views of the assembled metering device of an embodiment.

DETAILED DESCRIPTION

Figure 5F:
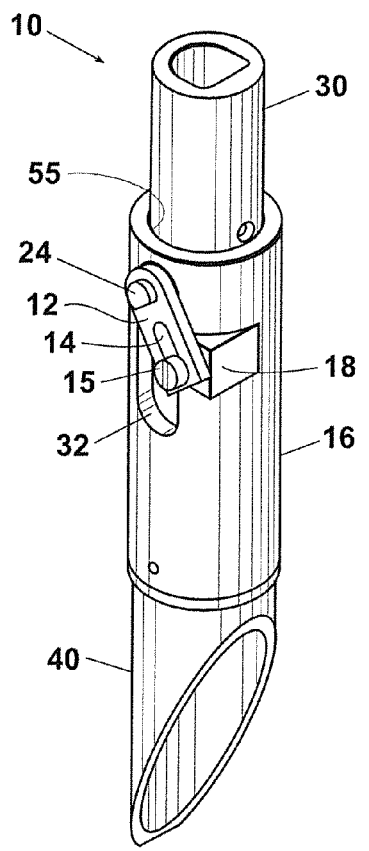

Before explaining an embodiment of the present invention in detail, it is important to understand that the invention is not limited in its application to the details of the construction illustrated and the steps described herein. The invention is capable of other embodiments and of being practiced or carried out in a variety of ways.

FIG. 1 provides multiple views of an embodiment including a side view of the reciprocating lever 12 of the metering device 10 of the present disclosure. In this embodiment, the reciprocating lever 12 attaches to the reciprocating drum 22 (FIG. 2) and transfers longitudinal motion along the axis of the external housing 16 (such as when the device is actuated by driving it into the soil) into rotary motion which can be used to rotate the reciprocating drum to meter granular product which may be contained in a hopper as is discussed in greater detail below. As is generally indicated in this figure, in one embodiment the external housing 16 will be generally cylindrical in shape and round in cross section, although that is not a requirement and other cross sectional shapes are would certainly be possible. Additionally, various external shapes might be chosen for the housing 16 but what is more important for operational purposes is the configuration of the housing's hollow interior 55 as compared with the outer surface of the reciprocating drum housing 30. That is, it would be preferred that the shape of the exterior of the reciprocating drum housing 30 should be matched to (or otherwise operable with) the shape of the interior 55 of the external housing 16 so as to allow manually initiated relative movement. In the present example, both are circular in cross section which would be useful in many instances.

Figure 5G:
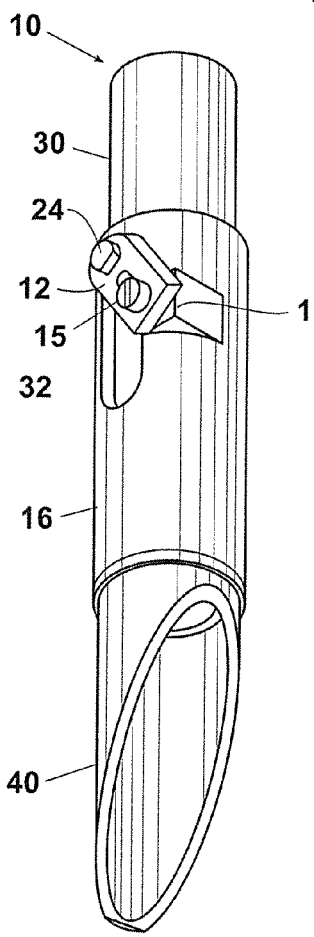

According to this embodiment, the reciprocating lever 12 mounts to a plate 18 (FIG. 3) on the external housing 16 by inserting a pin 15 (FIG. 5) through the guide slot 14 which is retained (fixed) to the plate 18 in a known manner. Pin 15 may be permanently attached to external housing 16 with the reciprocating lever 12 held in place by a cap on pin 15 or other means of restraint. Reciprocating lever 12 also includes a cam receiver 20 for receiving a cam 24 of reciprocating drum 22 (FIG. 2).

Continuing with the current embodiment, FIG. 2 provides a perspective view of the reciprocating drum 22 and cavity 28 for use with a product/material such as grain, for example. The cavity 28 can be made to accommodate various granular materials and effectively meters the product with precision. In some embodiments, this might be done by making the reciprocating drum 22 removable so that it can be replaced by a similarly sized drum with a cavity 28 of a different size (e.g., different in length, width, depth, shape, etc.), or by making the cavity size adjustable by inserting containers of different size into the cavity 28 void. Those of ordinary skill in the art will readily understand how such changes might be made.

In this embodiment, the reciprocating drum 22 is preferably cylindrical and includes a cam 24 on one (first) end and a rotational support 26 on the other (second) end. Cam 24 preferably includes a flattened segment 21 so as to be "keyed" with cam receiver 20 but could be of any desired geometry. Having the cam 24 "keyed" allows indexes the cavity 28 with the guide slot 14 to control rotation of the reciprocating drum 22. However, since according to the current embodiment cam 24 is inserted into cam receiver 20 of reciprocating lever 12, cam 24 and cam receiver 20 preferably will have the same basic geometry. Cam 24 may be removably secured to reciprocating drum 22 to facilitate assembly or modification of the metering system 10 of the present disclosure.

The embodiment of FIGS. 3 and 5 makes clearer one configuration of the external housing 16 of the metering system 10 of the present disclosure. The housing 16 surrounds the reciprocating drum housing 30 and serves as a mounting location for the soil engaging component 40. The reciprocating drum housing 30 slides in a substantially longitudinal fashion internally inside the external housing 16.

The reciprocating lever 12 connects to the external housing 16 and provides the rotary movement of the reciprocating drum 22 when the external housing 16 and reciprocating drum housing 30 move relative to each other. The cross-sectional geometry of both external housing 16 and reciprocating drum housing 30 may be substantially round as is indicated in the embodiments FIGS. 3 and 5. However, it is understood that other geometries are contemplated and within the ability of one of ordinary skill in the art to devise and all that is required of this embodiment is that the reciprocating drum 22 be longitudinally movable with respect to the external housing, whatever the cross-sectional shape of the two elements. Additionally, although the external housing 16 and reciprocating drum housing 30 are shown as being solid and generally cylindrical in shape, it should be noted that it is possible that apertures might be cut in one or the other of these elements which might be used to reduce the weight, material cost, etc. of the inventive device.

FIG. 4 provides a diagram of one embodiment of the reciprocating drum housing 30 that slides inside the external housing 16. Reciprocating drum housing 30 contains a hopper 38 that contains and stores product/material to be metered by reciprocating drum 22 and deposited into the soil that is adjacent to the soil engagement component 40. In an embodiment, the hopper 38 might be integral to and inside of the reciprocating drum housing 30 but that is not a requirement. In some embodiments, the soil engagement component 40 might be removable so that it can be replaced or sharpened.

Continuing with the current example, the reciprocating drum housing 30 includes a channel 34 for receiving a reciprocating drum 22 therein. In a preferred arrangement, channel 34 is substantially the same diameter as the maximum external dimension (diameter) of reciprocating drum 22. Reciprocating drum 22 is inserted through channel 34 such that rotational support 26 extends into and preferably through a rotational hole 36 in reciprocating drum housing 30. In this embodiment, rotational hole 36 is preferably round and preferably substantially matches the diameter of rotational support 26. Accordingly, when reciprocating drum 22 is inserted into reciprocating drum housing 30 it is supported in channel 34 on one (first) end and by end rotational hole 36 on the other (second) end.

FIGS. 5A-5G provide examples of the assembled metering system 10 and soil engaging device consistent with the teachings of the present disclosure.

As can be seen herein, upon assembly, cam 24 extends from reciprocating drum 22 supported within reciprocating drum housing 30 such that it extends through linear slot 17 of external housing 16 and into guide slot 14 of reciprocating lever 12. The guide slot 14 might be linear as is indicated in the figures hereto, or some other (e.g., curved) configuration. Reciprocating lever 12 is supported from external housing 16 by pin 15 so that reciprocating lever 12 can freely rotate and reciprocate with respect to pin 15 by pin 15 sliding in guide slot 14 and reciprocating lever 12 rotating around pin 15.

When metering device 10 is actuated as a result of a downward force by the farmer forcing soil engagement component 40 into the soil, reciprocating drum housing 30 slides downward within external housing 16. Cam 24 of reciprocating drum 22 supported within reciprocating drum housing 30 is likewise forced downward causing reciprocating lever 12 to reciprocate with respect to pin 15 of external housing 16. This reciprocation also causes reciprocating lever 12 to rotate about pin 15 as cam 24 slides in linear slot 32.

Rotation of reciprocating lever 12 causes cam 24 secured (keyed) within cam receiver 20 to rotate. Rotation of cam 24 causes reciprocating drum 22 to rotate within reciprocating drum housing 30. Rotation of reciprocating drum 22 positions cavity 28 below the segment of hopper 38 allowing material/product (such as another seed) contained within the hopper 38 to drop into cavity 28 of reciprocating drum 22. Thus, reciprocating drum 22 of metering device 10 is loaded.

Release of the downward force by the farmer, such as by lifting metering device 10 allows external housing 16 (preferably by gravity although it might be assisted by biasing force(s) such as an internal or external spring, etc.), to slide downward and/or reciprocating drum housing 30 to slide upward. Cam 24 of reciprocating drum 22 supported within reciprocating drum housing 30 likewise slides upward within linear slot 32 causing reciprocating lever 12 to reciprocate in the opposite direction with respect to pin 15. This reciprocation causes reciprocating lever 12 to rotate in the opposite direction about pin 15 as cam 24 slides in linear slot 32. Rotation of reciprocating lever 12 causes cam 24 secured (keyed) within cam receiver 20 to rotate in the opposition direction. Rotation of cam 24 in the opposite direction causes reciprocating drum 22 to rotate in the opposite direction within reciprocating drum housing 30. Rotation of reciprocating drum 22 causes a material/product (such as a seed) contained within cavity 28 of reciprocating drum 22 to drop out of cavity 28, which is deposited out of external housing 16 adjacent soil engagement component 40 and into the soil. The actuation described here results in the metered material being released on the upward movement of reciprocating drum housing 30 relative to the external housing 16. Additionally, it should be noted that the indexing of the reciprocating drum 22 could be reversed such that the metered material is released on the downward movement of the reciprocating drum housing 30 relative to the external housing 16.

Figure 6:
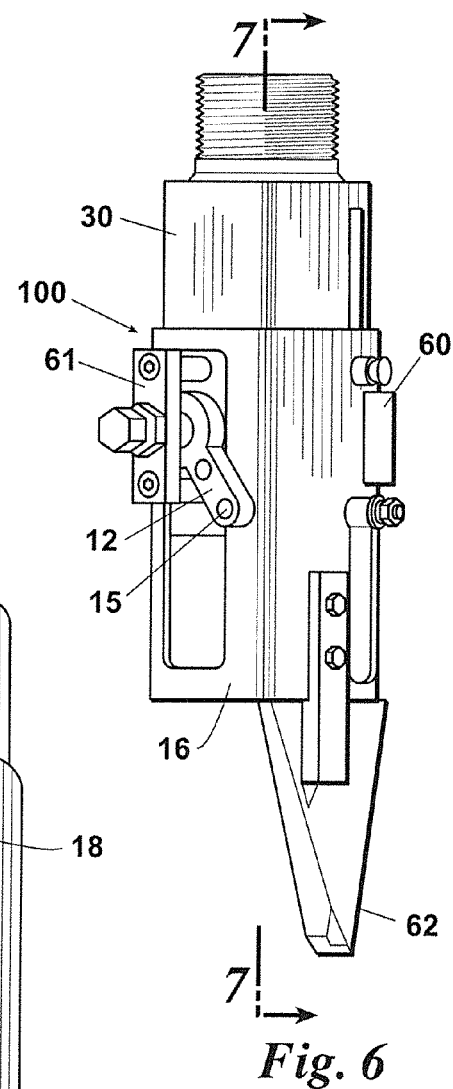
FIG. 6 contains an isometric view of an alternate embodiment of an assembled metering system and soil engaging device of the present disclosure.
Figure 7:
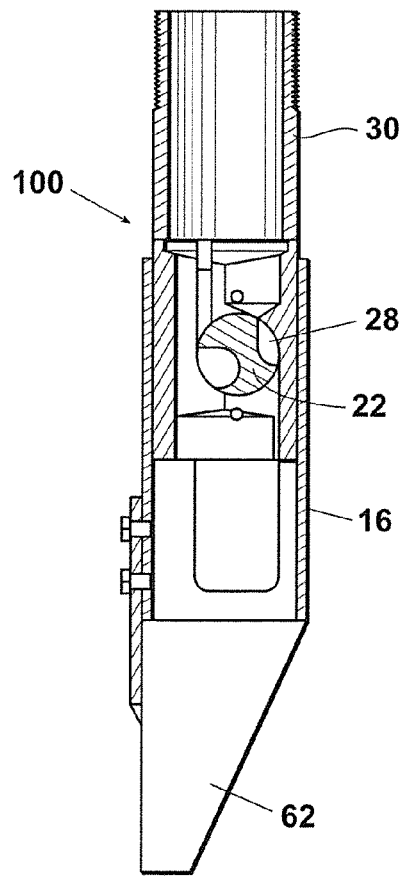
FIG. 7 is a side partial cutaway view of an alternate embodiment metering system and soil engaging device of the present disclosure.
Figure 8:
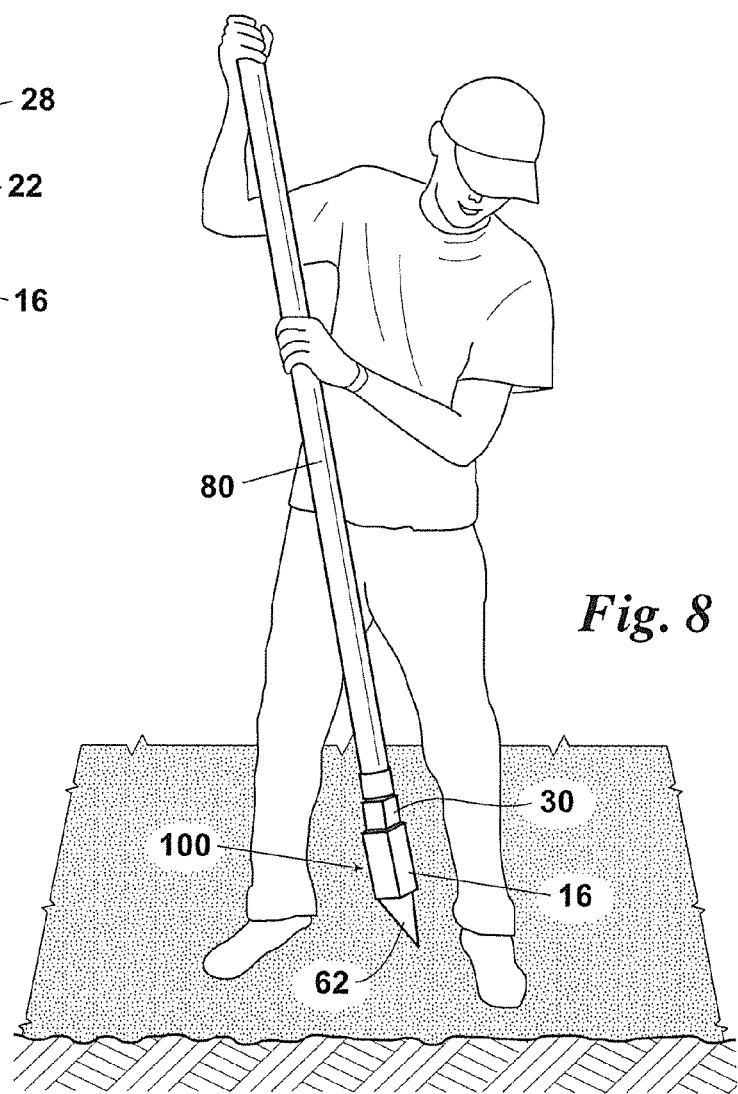
FIG. 8 depicts a farmer utilizing an embodiment of the metering system and soil engagement device of the present disclosure.

FIGS. 6 and 7 depict alternate embodiments of the meter of the present disclosure. FIG. 8 depicts a farmer employing an embodiment of the metering device of FIGS. 6 and 7. In this particular embodiment the inventive device is used in conjunction with a detachable handle 80. Generally speaking, this embodiment is configured as described previously with reciprocating drum housing 30 being situated within an external housing 16, with the relative movement of these two elements providing force for rotating the reciprocating drum 22. Additionally, an external biasing force (spring 60) has been added which would help restore the device 10 to its pre-engagement position. Further, this embodiment utilizes a plate 61 which is designed to help hold the reciprocating drum in place and a soil engagement component 62 that is designed to be removable for purposes of sharping, replacement, etc.

Finally, what is key is that a rotatable drum that contains one or more cavities therein be urged into rotation by manually initiated relative movement of inner and outer housing elements. The cavity in the rotating drum must be positionable to be alternatively in communication with a hopper containing seeds or other materials and the ground. The drum cavity will be sized to acquire and dispense a limited number or amount of such seeds or other materials in conjunction with a downward stroke and/or upward recoil of the metering device, to include instances when the materials are actually dispensed as the instant invention is withdrawn from contact with the soil. The rotational force might be supplied by relative movement of an inner and outer housing as is taught herein or by some other mechanism including, but not limited to, a rack and pinion or a linkage connecting the outer housing to the metering device that could potentially amplify its rotation. Those of ordinary skill in the art will readily be able to devise other methods of using the relative motion between the housing elements to rotate a drum according to the invention.

It should also be noted that, while farming applications of the inventive device and method were discussed in relation to the various embodiments, the invention is not to be so limited. The inventive method could be used to improve the efficiency of planting virtually any crop and for landscapes where mechanization is not possible or desirable.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e. g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e. g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

While this invention is susceptible of embodiment in many different forms, there is shown in the drawings, and is herein described in detail, some specific embodiments. It should be understood, however, that the present disclosure is to be considered an exemplification of the principles of the invention and is not intended to limit it to the specific embodiments or algorithms so described. Those of ordinary skill in the art will be able to make various changes and further modifications, apart from those shown or suggested herein, without departing from the spirit of the inventive concept, the scope of which is to be determined by the following claims.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A metering device, comprising an external housing including a linear slot therein; a hopper segment within said external housing, said hopper segment configurable to accept a dispensable material therein; a rotatable lever supported at one end by said external housing; said lever including a cam receiver; a reciprocating drum housing coaxial with said external housing and extending at least partially into said external housing; a reciprocating drum supported in said reciprocating drum housing, said reciprocating drum including a cam and a cavity, wherein said cam is engaged with said cam receiver through said linear slot, wherein initial rotation of said reciprocating drum causes said cavity to come into communication with said hopper and to acquire a dispensable amount of said material therein, and, wherein further rotation of said reciprocating drum causes said dispensable amount of said material to be deposited on the ground.

2. The metering device of claim 1 further including a pin secured to said external housing wherein said lever includes a guide slot for receiving said pin.

3. The metering device of claim 2 wherein said lever is capable of simultaneous reciprocating and rotational motion with respect to said external housing.

4. The metering device of claim 2 wherein said external housing includes a plate for supporting said pin.

5. The metering device of claim 1 further including a soil engagement component.

6. The metering device of claim 5 wherein said soil engagement component is supported from said external housing.

7. The metering device of claim 1 wherein said cavity is shaped for metering a product.

8. The metering device of claim 1 wherein said reciprocating drum including a first end and a second end; said cam extending from said first end and a rotational support on said second end; said reciprocating drum housing includes a channel for receiving said reciprocating drum and a rotational hole for receiving said rotational support.

9. A singulating hand planter for distributing a material, comprising:
    a. an external housing, said external housing containing a cylindrical interior;
    b. a reciprocating drum housing positionable to be at least partially within said interior of said housing and in alignment therewith, said reciprocating drum housing being longitudinally movable with respect to said external housing;
    c. a hopper internal to said external housing, said hopper at least for containing the material;
    d. a reciprocating drum mounted within said reciprocating drum housing and containing at least one cavity therein, whereby said longitudinal motion of said reciprocating drum housing with respect to said external housing urges the reciprocating drum into rotation, thereby causing said cavity to come into communication with said hopper thereby acquiring a dispensable amount of said material therein and to depositing said acquired material into the soil.

10. A singulating hand planter for distributing a material, comprising:
    a. an external housing having a central axis and having a hollow interior;
    b. a reciprocating drum housing aligned with said central axis of said external housing and being longitudinally movable along said central axis with respect to said external housing, said reciprocating drum housing having a terminus positionable to be within said external housing interior during said longitudinal movement;
    c. a hopper internal to said external housing, said hopper at least for containing the material;
    d. a reciprocating drum mounted within said reciprocating drum housing and containing at least one drum cavity therein, whereby said manually initiated longitudinal movement of said reciprocating drum housing with respect to said external housing urges the reciprocating drum into rotation, thereby causing said drum cavity
        i. to rotate into communication with said hopper,
        ii. to acquire a dispensable amount of said material from said hopper therein, and
        iii. to deposit said acquired material onto the ground.

11. The singulating hand planter according to claim 10 wherein said hopper is internal to said reciprocating drum housing.

* * * * *